UNITED STATES PATENT OFFICE 2,196,048

PRODUCTION OF BERYLLIUM COMPOUNDS

Carlo Adamoli, Milan, Italy, assignor to Perosa Corporation, Wilmington, Del., a corporation of Delaware No Drawing. Application March 20, 1937, Serial No. 132,592. In Italy April 22, 1932

2 Claims. (Cl. 23—16)

The present invention relates to a process for the production of beryllium compounds from beryllium-bearing minerals and has for its object the recovery of beryllium compounds by treatment of the minerals with fluorine compounds substantially without waste of fluorine as silicon fluoride.

It is known that, in the decomposition of silicates with hydrofluoric acid, the silicon escapes in the form of gaseous silicon tetrafluoride. In practice therefore it is generally necessary, in such a decomposition process, to employ three times as much fluorine as is required, in accordance with the stoichiometric proportions, for the reaction with the basic oxides.

It has for instance already been proposed to decompose beryl by heating the same with gaseous hydrofluoric acid at high temperature until no silicon fluoride escapes; in such a process with generation of $SiF_4$ as a gas with consequent loss of fluorine, the gaseous hydrofluoric acid alone cannot attack the beryllia selectively and so it is quite impossible to realize therewith a quantitative reaction.

The great difficulties arising, in practice, in the application of gaseous or dissolved hydrofluoric acid and in the exhausting of considerable quantities of silicon tetrafluoride, are also known. In this connection, mention may be made of the process described by J. Gibson (J. Chem. Soc., vol. 63 (1893), p. 909) and also by Gmelin-Kraut ("Handbuch der anorganischen Chemie" 8th Edn., vol. 26, p. 37—which merely repeats the citation in Gibson), for the production of beryllium fluoride, in which these inconveniences of operation are obviated by employing ammonium fluoride as the decomposing agent. Here again, however, the amount of fluoride employed must be six times greater than that stoichiometrically needed for reacting with the basic oxides. Up to the present, no suggestion has been published that would enable the formation of silicon tetrafluoride to be avoided by moderating this reaction.

All the Gibson disclosure is based on the decomposition of beryl and other like minerals by fusing with much double fluoride and recites the use of an amount of fluoride which is sufficient to combine with everything in the mineral, and this is a proportion much more important than necessary for binding the beryllium present in the mineral. In fact what Gibson did was to fuse the mineral with enough acid ammonium fluoride to react not only with the beryllia but with the silica to produce silicon fluoride; the ammonia in the mixture employed takes no part in the action, it is volatilized and escapes. A method such as Gibson's leads to very complex solutions as everything is put into solution save volatilized $SiO_2$; such an ammonium hydrogen fluoride treatment virtually depends on the action of HF alone and is thus practically the same as a treatment with free HF since the ammonia is at once volatilized and the HF attacks the silica, alumina, iron, etc., in addition to reacting with the BeO. As far as concerns the use of alkali-fluorides Gibson has not foreseen the possibility of obtaining good results with the same because his disclosure is based on the treatment of fused beryl with much fluoride and in this connection, he recites fusing beryl with potassium hydrofluoride, but states that the use of the same is unsatisfactory because of the necessity for powdering the fused mass before leaching.

Mention may also be made of the proposals put forward for utilising the action of the fluorine of the alkali silicofluorides. According to the French Patent No. 476,465 (Copaux Comptes rendus, vol. 168 (1919), p. 610; Chim. Ind., vol. 2 (1919), p. 914), 2 parts of sodium silicofluoride are employed to decompose 1 part of beryllium ore. The proportion 1:2 corresponds, stoichiometrically, to the proportion of 1 molecule of beryllium to 6 mols. of sodium silicofluoride.

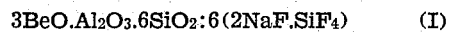
$$3BeO.Al_2O_3.6SiO_2 : 6(2NaF.SiF_4) \quad (I)$$

It is at once clear that twice as much fluorine is needed than would be required for decomposing the basic oxides per se. For this latter decomposition, half the amount of sodium silicofluoride actually employed would be sufficient according to the weight ratio 1:1, and therefore, stoichiometrically, according to the following equation:

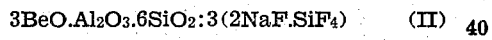
$$3BeO.Al_2O_3.6SiO_2 : 3(2NaF.SiF_4) \quad (II)$$

which proportion is employed in a recently published process ("Wissenschaftliche Veröffentlichungen aus dem Siemens-Konzern" 8, I (1929), p. 34, and also H. A. Sloman "Journ. Soc. Chem. Ind. 48, Transact, 309—16.18/10—1929 National physical Lab."). In this case, however, 26.7 litres of water, saturated with sodium fluoride, are needed to dissolve the sodium-beryllium fluoride formed from 1 molecule of beryllium—the solubility ratio of sodium-beryllium fluoride being 1:68, that is to say, only 1.47% (Marignac, Ann. Chem. Phys., vol. 30, IV (1873), p. 51: Arch. Phys. Nat., vol. 46, II (1873), p. 199). Since the solubility ratio of sodium fluoride in water at 21° C.

is 4% (Landolt-Börnstein, Phys. Chem. Tabellen, 5th Edn., vol. 1, p. 672), a large amount of fluorine—considerably exceeding even that employed in the Copaux process—is used in the liquor saturated with sodium fluoride; and it may be pointed out that the yield of beryllium, in this case, is still smaller, the amount of sodium fluoride required to saturate 26.7 litres of water being 1068 grms.

In this connexion also a method for the extraction of beryllium has been proposed, based on the use of sodium-fluosilicate $Na_2SiF_6$, in which silicon fluoride is caused to act in the gaseous state and in considerable excess of the amount required on a mixture of the mineral and sodium fluoride, so that the silicon fluoride combines with the sodium fluoride as well as with the beryllium to produce not only sodium fluo-beryllate and other metallic fluorine compounds but also sodium fluo-silicate $K_2SiF_6$; such a method unavoidably involves considerable waste of fluorine.

Now applicant has made searches in order to find a practical method for causing a reacting agent to attack in a preferential manner, in the beryllium-bearing mineral, the BeO or BeO-silicate, without reacting with the other elements or compounds contained in the mineral and without loss of fluorine, namely without loss of hydrofluoric acid and silicon tetrafluoride. The searches have been made more particularly in view of applying fluorine compounds to the preferential attack of BeO.

As fluorine is active principally in the form of hydrofluoric acid, but HF reacts even at ordinary temperature on the $SiO_2$ of the silicates, applicant has contemplated the use, together with HF, of an alkali substance and therefore more particularly the use of acid fluoride so called "bifluoride."

Accordingly the method for the preferential attack of the beryllium compounds by such fluorine compounds may be successfully applied not only—as the known methods—to minerals rich in beryllium such as beryl (which contains more than 10% of BeO in the form of double $BeO \cdot Al_2O_3$ silicate) but also to minerals bearing only a relatively small amount of beryllium, such for instance as impure beryl, feldspath, pegmatite, and so on.

The process of the present invention—which obviates the defects of the known processes for decomposing beryllium ores with fluorine compounds—is based on the discovery that the action of HF on minerals containing beryllium as well as silicon is preferential when acting in the presence of such a proportion of metal-fluoride that the amount of fluorine corresponds stoichiometrically to the amount of beryllium to be bound out of the mineral; especially when the HF is caused to act in the presence of an equimolecular or substantially equimolecular amount of metal-fluoride such as alkali-fluoride, for instance NaF, the beryllia is attacked, while the silica is not, provided that the stated ratio of reactants corresponding to the quantitative reaction is not substantially exceeded. If the amount of HF relative to the metal-fluoride be increased, HF is then wasted in forming silicon fluoride. In the right amount, acid bifluoride, that is alkali bifluoride such as for instance $NaF \cdot HF$—a solid substance—in admixture with beryllia containing minerals, on heating to temperatures around a red heat enters into reaction without fusion. From the treated mixture the complex metal-fluoride of beryllium (for instance double sodium-beryllium fluoride) can be leached out. Now it has been found, according to the invention, that even in the solid state and therefore without fusion, the beryllium-bearing silicates react with fluorine compounds containing the HF group, or capable of forming substances containing this group, without silicon tetrafluoride being thereby generated. Under such conditions the amount of fluorine compound with (HF) group employed according to the invention involves the use of much less fluoride than the old methods hereabove mentioned and no reaction is caused to take place on the silica at all. That is a great part of the merit of this invention; another merit is the obtaining of simple solutions carrying mainly complex metal-fluoride of beryllium (for instance double sodium beryllium fluoride) which needs little purification.

When the quantity of the decomposing fluorine salt is calculated in accordance with the total content of the basic oxides, the decomposition of the crude beryl proceeds by the reaction which—assuming for example that sodium bifluoride is employed as fluorine salt—is in accordance with the following equation:

The sodium-aluminium fluoride, $3NaF \cdot AlF_3$, resulting from this reaction is a mixture of the sodium- and aluminium fluorides of the general formula $XNaF \cdot AlF_3$, in which X may be less than, or equal to, 3, so that a portion—which may be as much as one-third of the amount originally taken—of the alkali fluoride, is leached out with the sodium-beryllium fluoride. The reaction according to the above Equation III begins already below dull red heat, its technical optimum being attained, a nearly theoretical yield, between 600 and 650° C.

According to the invention, assuming that acid sodium bifluoride be employed—it being understood that any other similar bifluoride (such for instance potassium bifluoride) or any other suitable fluorine compound could be employed—in practice, owing to the characteristic affinity of the HF groups for beryllium, the amount of acid sodium fluoride needed for the decomposition can be still further reduced and, in fact, to such amounts in which the fluorine content exactly corresponds to the beryllium content in the mineral. By operating in this manner, at least 90% of the beryllium present is converted into the water-soluble sodium-beryllium fluoride, without practically any conversion of the aluminium oxide. This method of carrying out the process offers the advantage that the whole of the fluorine in the decomposition salt passes, along with the beryllium, into solution in the form of sodium-beryllium fluoride and after the separation of the beryllium, is returned, in the form of sodium bifluoride to the working process, in order to serve for decomposing fresh quantities of beryllium ore. In this case, the reaction proceeds according to the following equation:

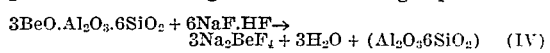

from which it is evident that only half the quantity of decomposition salt required in working in accordance with the earlier Equation III, is needed for the conversion of the beryllium contained in the ore into the leachable sodium-beryllium fluoride. On the other hand, this reaction has the advantage that, even in the case of ores low in beryllium, the proportion between the beryllium and the amount of the decomposition salt always remains constant, irrespective of the amount of beryllium in the ore.

The following example is given of the case in which the formation of the HF groups occurs only during the course of the reaction, and in which a neutral fluoride and an acid salt of an alkali are roasted with the beryllium mineral:

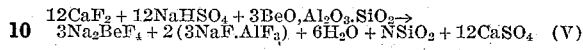
$$12CaF_2 + 12NaHSO_4 + 3BeO.Al_2O_3.SiO_2 \rightarrow$$
$$3Na_2BeF_4 + 2(3NaF.AlF_3) + 6H_2O + NSiO_2 + 12CaSO_4 \quad (V)$$

The above reaction occurs in accordance with Equation V when the amount of the decomposition salt corresponds to that of both the basic oxides. In practice, however, the amount of both the decomposition salts is reduced to one-half, without practically any decomposition of the aluminium oxide during the reaction. In such event, the reaction proceeds in accordance with the following equation:

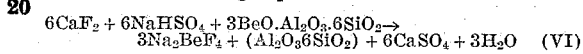
$$6CaF_2 + 6NaHSO_4 + 3BeO.Al_2O_3.6SiO_2 \rightarrow$$
$$3Na_2BeF_4 + (Al_2O_3 6SiO_2) + 6CaSO_4 + 3H_2O \quad (VI)$$

The foregoing equations show that, according to the process of the present invention, no formation of gaseous silicon tetrafluoride occurs. The technique of the present process consists in roasting the finely divided, beryllium-bearing mineral with the amount—calculated from the above equations—of a fluorine compound that contains a sufficient quantity of fluorine—and evolving an HF group—to convert the basic oxides into fluorides, with separation of the corresponding amount of H₂O. The HF groups are created by the well-known reaction between calcium fluoride and acid sodium sulphate, said reaction producing calcium sulphate and acid sodium fluoride in accordance with the following equation:

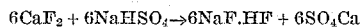
$$6CaF_2 + 6NaHSO_4 \rightarrow 6NaF.HF + 6SO_4Ca$$

The reaction No. VI, however, does not occur when a neutral fluoride is employed, except in cases in which the formation of substances containing one or more HF groups is brought about. The reactivity of the HF groups towards the beryllium-bearing minerals is so powerful and complete that the highest yields that are theoretically possible, under practical conditions, are obtainable.

It is therefore essential to the present process that the beryllium-bearing minerals should be mixed with an acid potassium or sodium bifluoride (NaF.HF) i. e. 37.09% Na, 1.61% H and 61.29% F—or of some other fluorine compound, the latter being in such an amount as to bind just the beryllium of the mineral, preferably containing or capable of furnishing two HF groups for each molecule of BeO contained in the mineral—and heated to temperatures below its melting point—preferably to 550–800° C.—the pulverulent or partly sintered decomposed material being then leached, and the sodium-beryllium fluoride recovered from the solution being subjected to further treatment. The reaction is conducted in such a manner that no gaseous silicon tetrafluoride is formed during the operation, to cause any loss of fluorine; and that the whole of the fluorine is present, together with the beryllium in the solution obtained by leaching, the leaching residues, consisting of aluminium oxide silicon, being practically free from fluorine.

The present process has the further advantage that the sodium-beryllium fluoride can be leached with water only, without the necessity of employing other salts, such as sodium fluoride, for that purpose. The highly siliceous residue from the leaching operation is not in the gel form, but remains sandy and easily and quickly filterable and washable.

A further advantage is obtained because the iron, always present in beryllium minerals, also remains, conjointly with the aluminium compounds in the residual mass, a circumstance that greatly simplifies the technique of the process and is of high practical importance, in view of the known fact that the separation of the, usually very small, quantities of the iron compounds present constitutes one of the greatest difficulties in the preparation of the beryllium—salts, in a pure state, from the ores.

Finally, another technical and economical advantage of the present process is to be discerned in that the amount of silica in the beryllium-bearing mineral is not increased by the addition of further quantities of silica during the decomposition, as in the case in several processes—such as those already mentioned as known. Consequently, the residual mass left by the present process is readily fusible and furnishes, in turn, an excellent material for the production of enamels, porcelain and the like.

As far as concerns the yield obtainable, by treating beryl for instance with NaF.HF, which reacts selectively on BeO only to produce a double sodium-beryllium fluoride, from which the beryllium-hydrate Be(OH)₂ is precipitated, for instance by means of soda, it is possible to obtain a solubilisation of the beryllium oxide with a yield up to 98%; the Be(OH)₂ serves as starting material for the obtaining either of beryllium in the form of pure metal or alloys thereof or of beryllium oxide BeO.

It is thus possible by the present process to produce with an extremely high yield and a very low price cost, from beryllium-bearing minerals, beryllium oxide through the intermediary state of beryllium fluoride (f. i. sodium-beryllium fluoride, potassium-beryllium fluoride or other complex metallic beryllium fluoride); and again this result may be obtained according to the invention by the treatment of the beryllium-bearing mineral not only with any bifluoride or any fluoride and HF, but with any fluorine compound furnishing the (HF) group in amount corresponding to the beryllium content of said mineral and capable of combining with the said beryllium, as well as with any substances capable of forming in the mass treated itself such fluorine compounds with (HF) group which are capable of binding the beryllium.

According to the invention the net cost of the production of the beryllium oxide may be still considerably reduced by the cyclic recovery of the reacting agents employed.

In fact, whatever may be the reacting agent employed, this reacting agent is always a compound containing hydrofluoric acid HF added to a fluoride such for example as an alkali fluoride, so a compound of formula: MF.HF (where M is a monovalent metal), or M'F₂.H₂F₂ (where M' is a bivalent-metal) and so on, or substances capable of yielding, in the reacting mass of treatment, MF+HF, M'F₂+H₂F₂, etc., in an amount corresponding to the quantitative reaction by which BeO is converted into M₂BeF₄, or M'BeF₄, etc., and therefore provided that the fluorine compound with (HF) group is caused to react in an amount corresponding stoichiometrically to the amount of beryllium of the mineral, the complex beryllium fluoride is the only salt with the beryllium that is produced, whatever may be the other elements or compounds of the minerals treated; it is also esential that the acid salt with group HF which is employed brings the Be in the form of a complex fluorine-beryllium salt which, alone amongst the other reaction products, can be easily extracted by water.

Now, it has been found that it is possible to regenerate the reacting agent containing the group HF, which is rather expensive, so as to recover substantially the whole of said reacting agent and thus carrying out successive operations without substantial loss of reacting agent.

This recovery is based on the fact that the group (HF) contained in the compounds of the type R.HF (where R is a fluoride-compound) has chemically the same power of attack as the group (HF) of the bifluorides such as MF.HF which is formed alone under special conditions (see "Gmelins Handbuch" ang. ch. Fluor, p. 46).

It is particularly advantageous to subject the mineral in fine powdered form to the reaction at a very low temperature of the acid salt containing HF as reacting agent (and capable to bind only the beryllium); the treatment may be effected with hydrofluoric acid, dissolved in aqueous solution, in the presence of a very small amount of acid fluoride of alkaline metal (for instance NaFHF or KFHF or the like, and thus all the beryllium, and only the beryllium, is bound out of the mineral.

It is moreover possible to operate a cycle of successive operations involving the complete recovery of the acid fluoride above mentioned, so that no reacting agent is finally consumed. For this purpose, for instance, the precipitation of the beryllium hydrate from the sodium-beryllium fluoride may be carried out with the aid of soda in such a manner as to bind the fluorine in the form of neutral fluoride (e. g., NaF).

This neutral fluoride may be then treated by a strong acid (for instance $NO_3H$, $SO_4H_2$) in such an amount that all the said neutral fluoride (for instance NaF) is converted into the corresponding acid fluoride (for instance NaFHF). The latter will thus be obtained in an amount corresponding stoichiometrically to the amount of bifluoride previously employed for the treatment, so that its recovery is complete and it may serve for the subsequent operation of treatment without further expense. Optionally, if it is desired to recover HF from the neutral fluoride, the latter may be treated by such an amount of a strong acid that all the fluorine is bound in the form of HF in aqueous solution.

In the practice of working in accordance with the invention, the successive operations for producing the beryllium hydroxide (and then the beryllium oxide) by starting from beryl and other beryllium-bearing minerals, and producing therefrom a complex metal-beryllium fluoride, such as for instance $Na_2BeF_4$ are preferably carried out as follows:

(a) *Mixing of the mineral and alkali fluoride*

The beryllium-bearing mineral, such namely as beryl in the form of "stony beryl," is first subjected to grinding and thereby brought in the form of powder approximately so fine as meal.

This mineral in powdered form is then entirely mixed in a grinder with alkali bifluoride such as acid sodium fluoride (bifluoride) in such a proportion that on every molecule of BeO present in the mineral there are caused to react two molecules of bifluoride. Then water is added (for instance 8% in weight of water) so as to bring the mixture in the state of an homogeneous paste.

(b) *Production of a complex beryllium fluoride*

The pasty mixture of beryl (or other beryllium-bearing mineral) and bifluoride is agglomerated in the form of briquets under small compression and these briquets are introduced in a furnace previously heated and are there subjected to a roasting for about two hours at a temperature between 550° C. and 800° C., preferably about 650° C.

Thus assuming that NaFHF is employed as bifluoride, the following reaction takes place stoichiometrically:

$3BeO - Al_2O_3 - 6SiO_2 + 6NaFHF \rightarrow$
$\quad 3Na_2BeF_4 + 3H_2O + (Al_2O_3 - 6SiO_2)$ and this reaction becomes completed at the end of the operation and thus the complex beryllium fluoride is produced in the proportion corresponding quantitatively to the above reaction.

(c) *Purifying and further treatment of the complex beryllium fluoride*

The roasted briquets are then pounded in presence of the same weight of water and thereafter subjected to leaching at about 90–100° C. for about 1½ hour with further addition of water corresponding to the solubility of the complex fluoride (for instance sodium-beryllium fluoride).

The reaction product after leaching may be filtered in pressing-filters; this filtration gives on the one hand a clear solution of the complex beryllium fluoride and on the other hand a solid paste formed of the silica and alumina initially contained in the mineral according to the above reaction. The solution of complex fluoride (sodium-beryllium fluoride), after having been purified if necessary from casual impurities still contained therein, may be thereafter brought in a heated closed vessel where the hydrate of beryllium is precipitated in the presence of soda at about 100° C. according to the reaction:

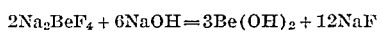
$2Na_2BeF_4 + 6NaOH = 3Be(OH)_2 + 12NaF$

The beryllium oxide is then obtained by calcination of the hydrate $Be(OH_2)$.

As far as concerns the neutral sodium fluoride given by the reaction, it may be recovered by evaporating the solution; and it is thereafter possible to recover therefrom—for instance by converting it into acid fluoride by treatment with hydrofluoric acid—the same amount of bifluoride as employed for the treatment, which bifluoride can thus be re-employed in the cycle of operations for the treatment of a further same quantity of beryllium-bearing mineral.

One of the main commercial advantages of the process such as just described is that beryllium oxide is obtained in an extremely pure state and this namely:

With a yield corresponding to the quantitative reaction (up to 98%)

With means of great simplicity for carrying out the whole operation;

With only the mineral, hydrofluoric acid and soda as starting materials;

With the possibility of recovering substantially the totality of the reacting agents.

Below are given three non-restrictive examples containing numerical indications for the carrying out of the present process.

*Example I*

100 kgs. of crystalline Madagascar beryl, containing about 3% of ferric oxide and 11.5% of beryllium oxide, and ground to fine powder, are intimately mixed with 60 kgs. of sodium bifluoride, and introduced into a muffle- or rotary furnace, the temperature of which is maintained at 600–650° C. for 1 hour. The charge material, which is not in a state of fusion, and does not liberate any gaseous silicon tetrafluoride during the treatment, does not corrode the ceramic lining of the decomposition furnace, and, consequently no special precautions in that direction are needed. During the decomposition, the charge material fully retains its pulverulent character, and shows a loss in weight of about 10 kgs. corresponding to the amount of water formed during the operation. The material is leached with hot water until the sodium-beryllium fluoride formed has passed into solution. In this connection, it should be noted that, in the new working method there is no need to add sodium fluoride to the leach liquor, which in these circumstances, contains about 55 kgs. of sodium-beryllium fluoride. In practice, the leaching can be performed in any convenient type of leaching apparatus that is employed in hydrometallurgy.

The aqueous liquor obtained in the herein described manner is then concentrated, with the addition of small quantities (about 15–20 grms.) of potassium permanganate, by means of which the manganese impurities contained in the mineral are converted into readily filterable manganese dioxide. The deposited impurities are removed and the liquor, thus roughly purified, is concentrated. The deposited sodium-beryllium fluoride is sufficiently pure to be employed directly for the electrolytic production of metallic beryllium.

The sodium-beryllium fluoride may serve for the production of beryllium oxyfluoride, for which purpose the solution of the sodium-beryllium fluoride is treated with a stoichiometrical quantity of ammonium siliconfluoride. On the solution being concentrated, the sparingly soluble sodium silicofluoride is thrown down, whilst the more readily soluble ammonium-beryllium fluoride remains in solution and can be separated from the deposit. On being moderately heated, the ammonium-beryllium fluoride obtained by evaporating the solution leaves a residue of beryllium oxyfluoride the voltaile ammonium fluoride being recoverable. This conversion can also be effected by adding the corresponding quantity of beryllium hydroxide, oxide or carbonate, to the ammonium-beryllium fluoride, and gently heating the mixture, gaseous ammonia being recovered.

The production of beryllium carbonate or oxide from sodium-beryllium fluoride can be effected in the following manner:

The saturated solution of the salt is treated with a quantity of concentrated caustic soda solution corresponding, stoichiometrically, to the amount of beryllium therein, so that the whole of the beryllium is precipitated as hydroxide. In contrast to the views previously held in this connection, the beryllium is completely deposited from the sodium-beryllium fluoride liquors and high dilutions can be avoided. The caustic soda solutions should not be employed in any excess, since, otherwise a portion of the beryllium hydroxide passes into solution as sodium beryllate and the yield is lowered. The precipitate is washed several times by decantation, and is then treated in aqueous ammonia, with carbon dioxide until dissolved. Simple boiling deposits from the solution a basic beryllium carbonate in a state of the highest purity which, in contrast to the hydroxide, is easily filterable and quickly washable. The yield of the beryllium carbonate is in approximately theoretical quantity.

The process of the present invention has the advantage of not introducing into the solution any new cations the separations of which from the fluorine would entail troublesome and laborious measures. With the working method of the present invention the beryllium, on the one hand, is obtained as basic carbonate and the fluorine, on the other is completely recovered, as sodium fluoride, which is returned to the process.

In the case of the decomposition of a mineral low in beryllium, such as pegmatite from the Musul valley—which contains only about 1% of beryllium oxide—the following procedure is preferably adopted.

*Example 2*

400 kgs. of beryllium-bearing pegmatite, from the Musul valley, near Bozen, and containing 0.75% of BeO, are finely ground and mixed with 20 kgs. of sodium bifluoride. The uniform distribution of the decomposition salt in the mass of the mineral is of the highest importance. The carefully prepared mixture is then introduced into a muffle or rotary furnace, heated to about 750° C. and maintained at that temperature for about 2 hours. The pulverulent mass is leached with hot water and about 10 kgs. of sodium-beryllium fluoride are recovered from the liquor.

*Example 3*

If, in place of beryl high in beryllium, opaque beryl crystals from the Musul valley (Bozen) and containing about 7% of BeO, be taken for decomposition, the amount of the decomposition salt in relation to the BeO content is reduced, 100 kgs., for example, of this beryl being treated with 40 kgs. of sodium bifluoride, and about 36 kgs. of sodium-beryllium fluoride recovered after leaching the charge.

What I claim is:

1. A process for the production of beryllium oxide from minerals containing beryllium and for the cyclic recovery of the reacting agent employed which consists in powdering the beryllium bearing ore, mixing the powder with an alkali bi-fluoride in an amount corresponding to two molecules of bi-fluoride for every BeO molecule present in the ore, adding water to form a paste, compressing the paste to briquets, heating the briquets to a temperature between 550° to 800° C. to cause the fluorine to combine with the beryllium to form a double alkali-fluoride, leaching the reaction product with pure water at a temperature of about 90° to 100° C., adding alkali-hydroxide to the alkali beryllium solution to precipitate beryllium as beryllium hydrate and form neutral alkali-fluoride, separating the neutral alkali-fluoride, calcining the beryllium hydrate to beryllium oxide, and treating said neutral alkali-fluoride with a strong acid other than hydrofluoric to convert the neutral alkali-fluoride to the corresponding acid fluoride.

2. A process for the production of beryllium oxide from minerals containing beryllium and for the cyclic recovery of the reacting agent employed which consists in powdering the beryllium bearing ore, mixing the powder with NaF.HF, in an amount of two molecules of NaF.HF for every molecule of BeO present in the ore, adding water to form a paste, compressing the paste to briquets, heating the briquets to a temperature between 550° to 800° C. to cause the fluorine to combine with the beryllium to form a double sodium-fluoride, leaching the reaction product with water at a temperature of about 90° to 100° C., adding sodium hydroxide to the sodium-beryllium solution to precipitate beryllium hydrate and form neutral sodium fluoride, separating the neutral sodium fluoride, calcining the beryllium hydrate to beryllium oxide and treating said neutral sodium fluoride with a strong acid other than hydrofluoric to convert the neutral sodium fluoride to sodium acid fluoride.

CARLO ADAMOLI.